United States Patent [19]

Lehman

[11] 4,355,941
[45] Oct. 26, 1982

[54] HAND TRUCK CONSTRUCTION

[76] Inventor: Clarence M. Lehman, 386 Schrock Rd., Worthington, Ohio 43085

[21] Appl. No.: 155,790

[22] Filed: Jun. 2, 1980

[51] Int. Cl.³ .................................................. B62B 1/02
[52] U.S. Cl. ...................................... 414/490; 280/47.27
[58] Field of Search .............. 280/47.27, 47.29, 47.17, 280/47.23, 47.24, 655; 414/490

[56] References Cited

U.S. PATENT DOCUMENTS 3,486,651 12/1969 Gottinger .......................... 414/490
3,712,496 1/1973 Miller ................................ 414/490

FOREIGN PATENT DOCUMENTS 143606 2/1950 Australia ........................ 280/47.29
625506 8/1961 Canada .......................... 280/47.27
523376 4/1955 Italy ................................ 414/490

Primary Examiner—Richard A. Bertsch
Assistant Examiner—Donald W. Underwood
Attorney, Agent, or Firm—Francis T. Kremblas, Jr.

[57] ABSTRACT

An improved hand truck for loading, transporting and unloading of containerized materials which is characterized by a pivoted frame section which in cooperation with a manually actuated release mechanism provides a lever to simply push a container from the platform of the truck or push the platform away from the container to simply and easily unload the container where desired.

1 Claim, 4 Drawing Figures

HAND TRUCK CONSTRUCTION

BACKGROUND

The well-known hand truck for loading transporting and unloading containerized goods have been used for decades as a means for manually handling materials. For many users, for practical or economy reasons, such hand trucks represent the most efficient and effective manner to transport such containers from one area to another.

However, a major drawback to these typical devices, has been the relatively difficult and cumbersome manner required to unload the container from the platform of the hand truck.

In many cases, the load must be pushed manually while the truck is wiggled back and forth to remove the load onto the floor. Since in many instances, it is desirable to unload the container in a specific position, such as against a wall or closely adjacent to a stack of other containers, the unloaded container was deposited in a position which required further manual effort and time to position it as desired after it has been removed from the platform.

Although this cumbersome problem of unloading has been a long recognized problem, the utility of hand trucks for such applications remains great and no solution to this problem, prior to the present invention, has been devised.

SUMMARY OF INVENTION

The present invention relates generally to material handling devices and particularly to a novel, improved, manually operated hand truck.

These hand trucks are of simple construction and include a generally L-shaped frame mounted on a pair of wheels, with the lower portion of the frame constituting a platform or bed which supports a container or the like in cooperation with the vertical portion of the frame.

The present invention is characterized by the provision of a pivoted or hinged portion of the vertically disposed frame connected to the lower portion which is in fixed relationship to the platform and which carries the wheels for portability.

A release bar is provided to releasably hold the pivoted upright frame portion in a fixed position during loading and transport.

Upon actuation of the release bar, the pivoted frame portion is used as a lever to push the cargo from the platform or, in the case of heavy or bulky cargo, to effect the backward movement of the platform away from the cargo, as desired.

This feature drammatically improves the unloading characteristics of the truck and eliminates the difficulties encountered with a standard or typically constructed hand truck of the prior art.

OBJECTS

It is therfore a primary object of the present invention to provide a hand truck for transporting cargo which is of simple construction and provides greatly improved ease of handling when unloading the cargo.

It is another object of the present invention to provide a hand truck of the type described which permits the user to manipulate a release bar in a very convenient manner to actuate a lever type frame section to manipulate the load from the platform with significantly less physical effort and without extraneous manipulation of the truck or load.

It is still a further object of the present invention to provide a hand truck of the type described which permits the user to unload the cargo in a more precise manner relative to location, such as flush against a wall or the like or in relatively limited spacial areas, without further manual handling of the cargo to achieve the desired positioning.

Further objects and advantages of the present invention will be apparent from the foregoing description, reference being had to the accompanying drawings wherein a preferred form of embodiment of the invention is clearly shown.

IN THE DRAWINGS

DESCRIPTION

Figure 1:
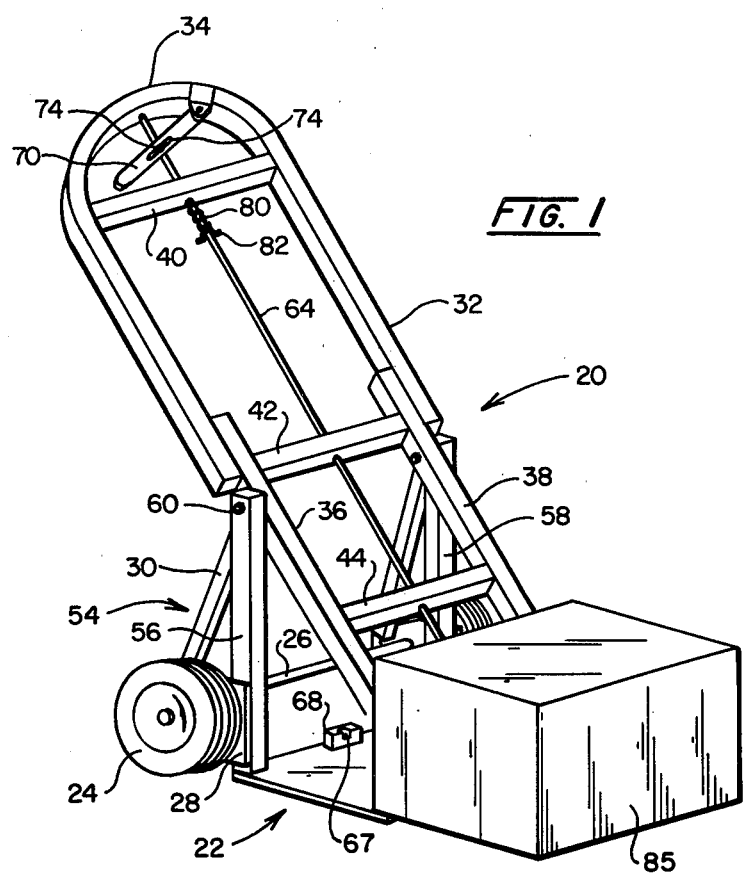
FIG. 1 is a perspective view of a hand truck or cart constructed in accordance with the present invention.
Figure 2:
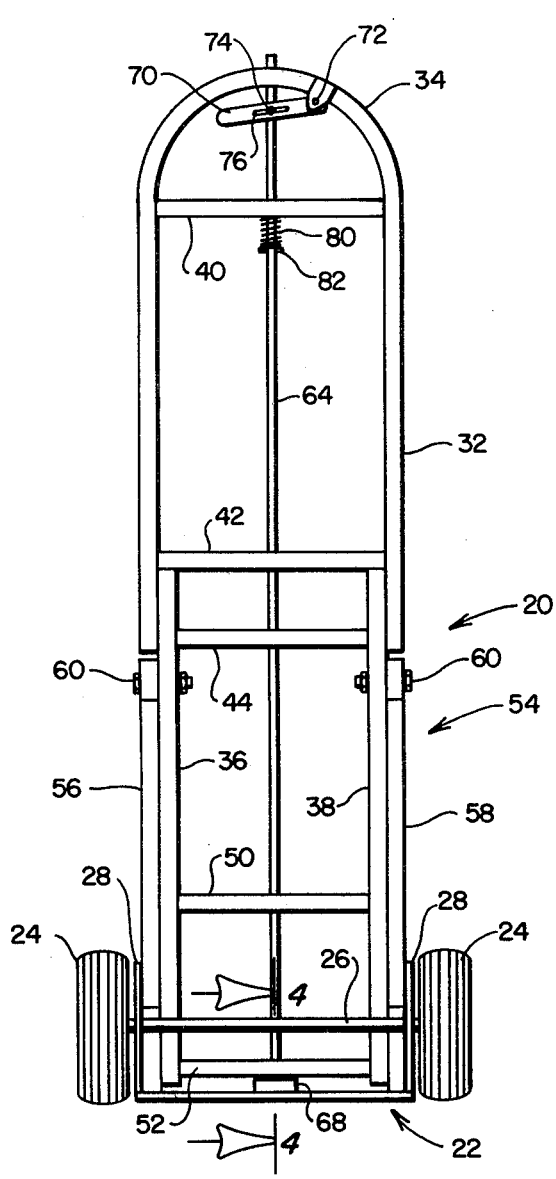
FIG. 2 is a rear elevational view of the hand truck shown in FIG. 1.
Figure 3:
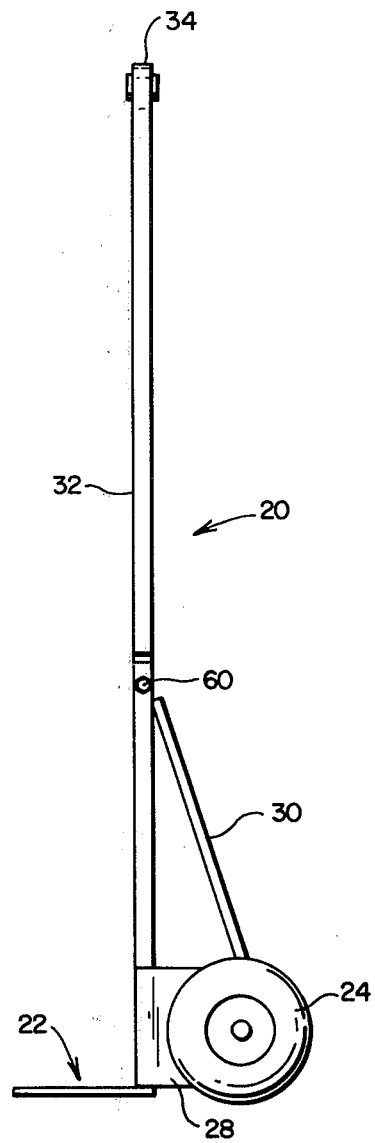
FIG. 3 is a side elevational view of the hand truck of the preceding Figures.

A hand truck or cart constructed in accordance with the present invention is shown in FIGS. 1-3 and includes a generally vertically disposed frame portion, indicated generally at 20 and a generally horizontally disposed platform or bed portion indicated generally at 22 which form a generally L-shaped configuration as best seen in FIG. 3.

A pair of conventional wheels 24 are rotatable mounted on an axle 26 which in turn is mounted on rearwardly extended flanges 28.

A pair of support rods 30 are connected between the vertical frame portion 20 and axle 26.

The generally vertically disposed frame portion 20 includes an upwardly extended portion 32 provided with a generally curved handle portion 34 and downwardly extending legs 36 and 38. Horizontal support bars 40, 42, 44, 48, 50 and 52 provide strength and stiffness.

Frame portion 20 also includes a lower portion indicated generally at 54 comprising outer brace members 56 and 58 which are fixed to horizontally and forwardly extending platform 22 and to side flanges 28.

The upwardly extending portion 32 and legs 36 and 38 are pivotally connected to the lower portion 54 via pins 60 extended through legs 36 and 38 and brace members 56 and 58 respectively to permit the upper portion 32 and legs 36 and 38 to pivot forwardly relative to the lower portion 54 and bed or platform 22.

Figure 4:
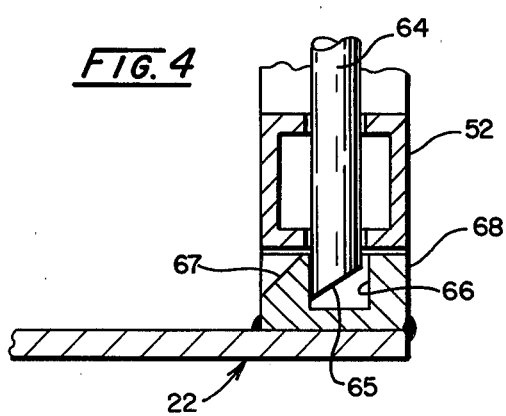
FIG. 4 is a partial side elevational view in section of a portion the hand truck shown in FIG. 1, the section being taken along line 4—4 in FIG. 2.

An elongated rod 64 is provided and is extended downwardly through appropriate holes in handle 34 and each of the horizontal supports 40-52 and terminates in an annular seat 66 provided in a block 68 fixed on the rear portion of platform 22 as best seen in FIG. 4.

An actuating level 70 which is pivotally connected to handle 34, such as at 72, and to rod 64 via a pin 74 extended through a slot 76 in lever 70 permits rod 64 to be manually raised by lifting lever 70 upwardly.

A spring 80, mounted in surrounding relationship to rod 64 between bar 40 and a fixed ring 82, provides a downwardly biasing force on rod 64 urging it toward annular seat 66.

Therefore, from the foregoing description it should be understood that a user may manually release rod 64 from seat 66 by lifting the free end of lever 70 upwardly which permits upper portion 32 to be pivoted rearwardly swinging legs 36 and 38 forwardly.

Upon pivoting upper portion 32 in the opposite direction, legs 36 and 38 may be realigned with outer braces 56 and 58 and rod 64 may be manipulated into engagement with seat 66 to fix the position of both vertically extending portions 32 and 54 relative to one another. In this fixed position, as shown in FIGS. 2 and 3, the hand truck assumes the typical loading and carrying configuration and is operated in a fashion substantially identical to a conventional hand truck of the prior art.

Referring to FIG. 4, block 68 also includes an inclined forwardly facing slot 67 which in cooperation with an inclined bottom surface 65 on rod 64 permits the user to merely swing the leg portions 56 and 58 and the remainder of the frame portion carrying rod 64 toward block 68 to effect engagement of rod 64 into seat 66.

Upon engagement the inclined planes of the slot 67 and bottom surface 65 force rod 64 upwardly against the biasing force of spring 60.

Upon reaching the opening of seat 66, the rod 64 tends to fall in position in seat 66 via the spring force without the necessity of manipulating lever 70.

In operation, with the hand truck of the present invention in the load carrying configuration of FIGS. 2 and 3, the user loads a container or the like onto platform 22 in the conventional manner. This usually consists of manually tilting one side of the load to slide the leading edge of platform 22 under the portion of the load. Then upon pulling downwardly on handle portion 34, which tips platform 22 upwardly, the load may be manipulated onto the platform 22.

With the vertical portion of the frame in this slanted configuration, the load is transported conventionally to the unloading designation.

At this point, the operation of the present invention departs from the operation of a conventional hand truck.

To unload or remove a container, such as 85 for example, from platform 22, the user merely lifts the free end of lever 70 upwardly against the biasing force of spring 80 to effect the lifting of the lower portion of bar 64 free of seat 66 and then pulls downwardly to pivot frame portion 32 and the legs 56 and 58 about pivot pins 60. At the same time, the user places his foot against the wheels 24 on the lower portion 54. This causes the legs 36 and 38 and the associated horizontal members to push the container 85 outwardly and off of platform 22. The length of the releasably movable frame portion above pivot pins 60 provides leverage to permit a significant mechanical advantage to move a relatively heavy load.

However, if the load is very heavy, one may merely choose not to stabilize the wheels 24 or frame portion 54 with his foot or the like, and then pulls downwardly on handle portion 34 in an identical manner as described above. This effectively causes the wheels 24 and the lower portion 54 fixed to platform 22 to move away from the load to effectively slide platform 22 out from under the load. In either fashion, relatively small force is required to unload the cargo and no repeated and difficult manipulation of the whole frame is required.

Once the load is removed, the user merely swings handle portion 34 upwardly to realign the frame portion 32 with frame portion 54 to effect the seating of bar 64 in seat 66 and the two frame portions are locked in the loading and carrying configuration as originally described. Of course, when this is done, the user merely stabilizes the lower frame 54 or wheels 24 to effect the locking action.

It should be readily apparent that the two frame portions described which are pivotally movable with respect to one another provide an easy, very conveient means for unloading cargo from the platform 22. However, it should also be pointed out that this feature additionally permits the load to be more precisely placed as desired. For example, it may be desirable to place cartons or the like flush against the wall or another stack of cartons. With the conventional truck, it is nearly impossible to deposit the load flush against another vertical surface because of the manner the cart must be manipulated to remove the load. With the present invention, it is very easy to deposit the load flush against such a vertical surface because the container may be pushed toward or against the vertical wall and effectively pull platform 22 away from such a surface while maintaining the forward pressure on the load with frame portion 32.

This feature can save many man-hours of labor as it not only reduces the time and effort of unloading, but further reduces or eliminates the extra man-hours required to more precisely stack or place the load once it is removed from the hand truck.

From the foregoing description, it should be readily apparent that the hand truck of the present invention represents a significant improvement over the prior art and is of relatively simple construction. Yet it afford a simple, easily operated labor-saving means which solves a well-recognized and long-standing deficiency present in the prior conventional tayp hand trucks.

What is claimed is:

1. A portable load carrying hand truck comprising, in combination, a generally vertically disposed first frame portion pivotally connected at a position intermediate in ends to a second frame portion having an upper and lower end, said second frame portion normally disposed in parallel aligned relationship relative to said first frame portion, said first frame portion including an upper end forming an integral upper handle portion and a lower load engaging portion; said second frame portion having its upper end attached at said pivot connection and extending downwardly from said pivot connection with said first frame portion and including an axle means provided with wheel means and a platform fixed to and extending outwardly at approximately a right angle from the lower end of said second frame portion; and means for releasably locking said first and second frame member in fixed parallel alignment with one another whereby said upper handle portion of said first frame portion is operable to manipulate said wheel means and platform into a load carrying position; and to independently pivot said lower load engaging portion of said first frame portion relative to said second frame portion upon release of said locking means; said locking means including an elongate rod member connected to said first frame portion for vertical slideable movement and disposed substantially along the vertical centerline of said first frame portion and includes a lower end portion extending downwardly towards said platform, a seat portion mounted on said platform adapted to receive said lower end portion to form a locked position;

spring means mounted on said bar member to bias said bar member toward said seat and an actuating lever pivotally mounted at one end to said upper handle portion and to said rod member intermediate to the ends of said lever, the free end of said lever disposed closely adjacent to said upper handle portion for manipulation simultaneously with manipulation of said handle portion.

* * * * *